(12) United States Patent
Kamio et al.

(10) Patent No.: US 7,981,278 B2
(45) Date of Patent: Jul. 19, 2011

(54) GASOLINE-ETHANOL SEPARATION APPARATUS

(75) Inventors: Junichi Kamio, Wako (JP); Yasuyuki Kubo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 433 days.

(21) Appl. No.: 12/230,406

(22) Filed: Aug. 28, 2008

(65) Prior Publication Data

US 2009/0065409 A1    Mar. 12, 2009

(30) Foreign Application Priority Data

Sep. 6, 2007   (JP) ................. 2007-231932

(51) Int. Cl.
   *B01D 17/12*   (2006.01)
   *B01D 17/032*  (2006.01)

(52) U.S. Cl. .......... 210/86; 123/1 A; 210/96.1; 210/114; 210/115; 210/123; 210/134; 210/519; 210/521; 210/533; 210/540

(58) Field of Classification Search ............... 123/1 A, 123/3, 198 A, 431, 432, 436; 210/86, 97, 210/104, 112, 114, 115, 123, 134, 171, 172.6, 210/96.1, 259, 519, 521, 533, 540
See application file for complete search history.

(56) References Cited

U.S. PATENT DOCUMENTS

| | | | | |
|---|---|---|---|---|
| 2,461,580 A * | 2/1949 | Wiczer et al. | ............... | 123/25 A |
| 2,525,154 A * | 10/1950 | Taylor | ............... | 210/115 |
| 4,031,864 A * | 6/1977 | Crothers | ............... | 123/1 A |
| 4,136,652 A * | 1/1979 | Lee | ............... | 123/514 |
| 5,637,234 A * | 6/1997 | McCasland | ............... | 210/801 |
| 6,416,675 B1 * | 7/2002 | McCasland et al. | ..... | 210/748.02 |
| 7,290,505 B2 * | 11/2007 | Kamio et al. | ............... | 123/1 A |
| 7,370,609 B2 * | 5/2008 | Kamio | ............... | 123/1 A |
| 7,389,751 B2 * | 6/2008 | Leone | ............... | 123/1 A |
| 7,395,786 B2 * | 7/2008 | Leone et al. | ............... | 123/1 A |
| 2005/0016905 A1 * | 1/2005 | Lindow | ............... | 210/120 |
| 2006/0102136 A1 * | 5/2006 | Bromberg et al. | ....... | 123/198 A |
| 2007/0163537 A1 * | 7/2007 | Kamio et al. | ............... | 123/304 |

FOREIGN PATENT DOCUMENTS

| | | |
|---|---|---|
| JP | 6-280696 A | 10/1994 |
| JP | 2006-132368 A | 5/2006 |
| JP | 2006-257907 A | 9/2006 |
| JP | 2007-46538 A | 2/2007 |
| JP | 2007-56707 A | 3/2007 |
| JP | 2007-187112 A | 7/2007 |

* cited by examiner

*Primary Examiner* — Joseph W Drodge
(74) *Attorney, Agent, or Firm* — Birch, Stewart, Kolasch & Birch, LLP (57) ABSTRACT

This present invention provides a gasoline-ethanol separation apparatus which is used for an internal combustion engine, and can separate a mixture fuel formed of mixed gasoline and ethanol into gasoline and ethanol. The gasoline-ethanol separation apparatus 1 includes a fuel tank 2 for accommodating a mixture fuel, a separation tank 4 for separating the mixture fuel supplied from the fuel tank 2 into the gasoline (A) and an ethanol-water mixture liquid (B), by mixing water supplied by water-supply means 3 with the mixture fuel, and storing the separated mixture liquid (B); pressurizing means 5 for pressurizing the mixture liquid (B) to be supplied into the separation tank 4; gasoline-taking-out means 6 for taking the gasoline (A) out of the tank from an upper part of the interface between the gasoline (A) and the ethanol-water mixture liquid (B) first valve 62; and ethanol-taking-out means 7 for taking the ethanol-water mixture liquid (B) out of the separation tank 4 through a second valve 72.

14 Claims, 4 Drawing Sheets

GASOLINE-ETHANOL SEPARATION APPARATUS

BACKGROUND OF THE INVENTION

1. Field of the Invention

The present invention relates to a gasoline-ethanol separation apparatus for separating a mixture fuel formed of mixed gasoline and ethanol into gasoline and an ethanol-water mixture liquid by mixing water with the mixture fuel.

2. Description of the Related Art

In recent years, a compression ignition internal combustion engine represented by a homogeneous charge compression ignition internal combustion engine has been investigated so as to enhance a fuel efficiency of an internal combustion engine and reduce emissions. The compression ignition internal combustion engine is an engine of introducing an oxygen-containing gas and a compression self-ignitable fuel into a cylinder, and compressing the mixture gas to self-ignite the mixture gas.

However, the compression ignition internal combustion engine has difficulty in controlling the timing of ignition in contrast to a spark ignition type internal combustion engine, and has a problem that the operation region capable of stably operating the engine is narrow. More particularly, the above described compression ignition internal combustion engine has a problem of easily causing knocking when a high load is required to the engine which uses fuel with high ignitability, and easily causing flame off when a low load is required to the engine which uses fuel with low ignitability.

To solve the above described problem, a compression ignition internal combustion engine is known which comprises a plurality of fuels having different ignitabilities and is controlled by changing an amount of each fuel to be supplied according to the required load. The above described compression ignition internal combustion engine mixes water, for instance, with a single mixture fuel of a liquid hydrocarbon having high ignitability and an alcohol having low ignitability, and thereby separates the resultant mixture into the liquid hydrocarbon and an alcohol-water mixture liquid which has been formed as a result of mixing alcohol with water. The above described compression ignition internal combustion engine is controlled by changing an amount of the mixture fuel to be supplied, an amount of the liquid hydrocarbon to be supplied and an amount of the alcohol-water mixture liquid to be supplied, according to the required load of the engine (See Japanese Patent Laid-Open No. 2006-132368).

A liquid hydrocarbon-ethanol separation apparatus used for the above described compression ignition internal combustion engine is proposed by the applicant of the present invention, which comprises: a first fuel tank for accommodating the mixture fuel formed by mixing the liquid hydrocarbon with ethanol; a water tank for accommodating water to be mixed with the mixture fuel; a second fuel tank for mixing the mixture fuel with water and separating the resultant mixture into the liquid hydrocarbon and an ethanol-water mixture liquid; a third fuel tank for accommodating the separated liquid hydrocarbon; a fourth fuel tank for accommodating the separated ethanol-water mixture liquid; and besides, first to fourth metering pumps which transport the liquids between the water tank and each of the first to fourth fuel tanks (See Japanese Patent Laid-Open No. 2007-46538).

The above described liquid hydrocarbon-ethanol separation apparatus makes the first metering pump supply the above described mixture fuel accommodated in the first fuel tank to the second fuel tank, at first. Subsequently, the second metering pump supplies water accommodated in the water tank to the second fuel tank. Then, water is mixed with the above described mixture fuel in the second fuel tank by being stirred. In the second fuel tank, the ethanol-water mixture liquid is formed by the above described mixing operation, and the ethanol-water mixture liquid is separated from the above described liquid hydrocarbon. Then, the above described liquid hydrocarbon having relatively-small specific gravity forms an upper layer, and the ethanol-water mixture liquid having relatively-large specific gravity forms a lower layer.

Then, the third metering pump supplies the above described liquid hydrocarbon which has been separated from the above described mixture fuel and is accommodated in the second fuel tank to the third fuel tank, and the supplied liquid hydrocarbon is accommodated in the third fuel tank. On the other hand, the fourth metering pump supplies the above described ethanol-water mixture liquid which has been separated from the above described mixture fuel and is accommodated in the second fuel tank to the fourth fuel tank, and the supplied ethanol-water mixture liquid is accommodated in the fourth fuel tank.

The above described liquid hydrocarbon-ethanol separation apparatus can separate the above described mixture fuel into the above described liquid hydrocarbon and the above described ethanol-water mixture liquid, but needs four metering pumps which are considerably heavy, on this account. In addition, in order to take out each of the above described liquid hydrocarbon accommodated in the third fuel tank and the above described ethanol-water mixture liquid accommodated in the fourth fuel tank and supply each of them to the above described compression ignition internal combustion engine, the liquid hydrocarbon-ethanol separation apparatus further needs metering pumps for the third and the fourth fuel tanks. Accordingly, the above described liquid hydrocarbon-ethanol separation apparatus unavoidably makes the weight of the whole apparatus large.

However, in order to be mounted in a mobile unit such as automobile, the above described liquid hydrocarbon-ethanol separation apparatus is desired to be lightweight. For this reason, a liquid hydrocarbon-ethanol separation apparatus is proposed by the applicant of the present invention, which supplies a fuel by controlling an internal pressure in each fuel tank instead of using the above described metering pump (See Japanese Patent Laid-Open No. 2007-56707).

In the liquid hydrocarbon-ethanol separation apparatus, the above described first to fourth fuel tanks and the above described water tank are mutually connected through a liquid-supply pipe having a liquid-supply on-off valve on the way. In addition, the above described first to fourth fuel tanks are each connected to a vacuum pump through an air suction pipe having a suction on-off valve on the way, and respectively include an air open valve.

The above described liquid hydrocarbon-ethanol separation apparatus, at first, makes the above described vacuum pump operated in a state of closing all of the valves; and decompresses the inner part of the second fuel tank by opening a first suction on-off valve provided on the way of a first air suction pipe which connects the above described vacuum pump with the second fuel tank.

Next, the liquid hydrocarbon-ethanol separation apparatus opens a first air open valve provided in the first fuel tank, and simultaneously opens the first liquid-supply on-off valve provided on the way of a first liquid suction pipe which connects the first fuel tank with the second fuel tank to supply the above described mixture fuel accommodated in the first fuel tank to the second fuel tank caused by a pressure difference between the air and the inner part of the second fuel tank. When the predetermined amount of the above described mixture fuel has been supplied to the second fuel tank, the first liquid-supply on-off valve is closed to stop the supply of the above described mixture fuel. The first air open valve is closed after the supply of the above described mixture fuel has been stopped.

Next, the liquid hydrocarbon-ethanol separation apparatus opens a second liquid-supply on-off valve provided on the way of a second air suction pipe for connecting the above described water tank and the second fuel tank to supply water accommodated in the water tank to the second fuel tank caused by a pressure difference between the air and the inner part of the second fuel tank. When the predetermined amount of water has been supplied to the second fuel tank, the second liquid-supply on-off valve is closed to stop the supply of water.

Next, a first air-suction on-off valve is closed, and then, a second air open valve provided in the second fuel tank is opened to return the internal pressure of the second fuel tank to atmospheric pressure. The second air open valve is closed, after the internal pressure of the second fuel tank has been returned to atmospheric pressure.

Subsequently, water is mixed with the above described mixture fuel by being stirred in the second fuel tank. In the second fuel tank, an ethanol-water mixture liquid is formed by the above described mixing operation, and the ethanol-water mixture liquid is separated from the above described liquid hydrocarbon. Then, the above described liquid hydrocarbon having relatively-small specific gravity forms an upper layer, and the ethanol-water mixture liquid having relatively-large specific gravity forms a lower layer.

A second air-suction on-off valve provided on the way of a second air suction pipe which connects the above described vacuum pump with the third fuel tank is opened to decompress the inner part of the third fuel tank. Next, the liquid hydrocarbon-ethanol separation apparatus opens the second air open valve provided in the second fuel tank, and simultaneously opens a third liquid-supply on-off valve provided on the way of a third liquid suction pipe which connects the second fuel tank with the third fuel tank to supply the above described liquid hydrocarbon accommodated in the second fuel tank to the third fuel tank caused by a pressure difference between the inner part of the second fuel tank and the inner part of the third fuel tank. When the predetermined amount of the above described liquid hydrocarbon has been supplied to the third fuel tank, the third liquid-supply on-off valve is closed to stop the supply of the above described liquid hydrocarbon. The second air open valve is closed after the supply of the above described liquid hydrocarbon has been stopped.

Next, the second air-suction on-off valve is closed, and then, a third air open valve provided in the third fuel tank is opened to return the internal pressure of the third fuel tank to atmospheric pressure. The third air open valve is closed, after the internal pressure of the third fuel tank has been returned to atmospheric pressure.

Next, a third air-suction on-off valve provided on the way of a third air suction pipe which connects the above described vacuum pump with the fourth fuel tank is opened to decompress the inner part of the fourth fuel tank. Next, the liquid hydrocarbon-ethanol separation apparatus opens the second air open valve provided in the second fuel tank, and simultaneously opens a fourth liquid-supply on-off valve provided on the way of a fourth liquid suction pipe which connects the second fuel tank with the fourth fuel tank to supply the above described ethanol-water mixture liquid accommodated in the second fuel tank to the fourth fuel tank caused by a pressure difference between the inner part of the second fuel tank and the inner part of the fourth fuel tank. When the predetermined amount of the above described ethanol-water mixture liquid has been supplied to the fourth fuel tank, the fourth liquid-supply on-off valve is closed to stop the supply of the above described ethanol-water mixture liquid. The second air open valve is closed after the supply of the above described ethanol-water mixture liquid has been stopped.

Next, the third air-suction on-off valve is closed, and then, a fourth air open valve provided in the fourth fuel tank is opened to return the internal pressure of the fourth fuel tank to atmospheric pressure. The fourth air open valve is closed, after the internal pressure of the fourth fuel tank has been returned to atmospheric pressure.

Through the above described operations, the above described liquid hydrocarbon separated from the above described mixture fuel is accommodated in the third fuel tank, and the above described ethanol-water mixture liquid separated from the above described mixture fuel is accommodated in the fourth fuel tank. The above described liquid hydrocarbon-ethanol separation apparatus does not use the metering pump, and accordingly can reduce the weight of the whole apparatus.

However, the above described liquid hydrocarbon-ethanol separation apparatus still comprises 5 tanks, so that the whole apparatus unavoidably becomes large. The liquid hydrocarbon-ethanol separation apparatus also combines a switching operation of four air open valves, a switching operation of four liquid-supply on-off valves and a switching operation of three air-suction on-off valves to supply fuel or water by using a difference among internal pressures of a fuel tank of a supply source, a water tank and a fuel tank of a receiving side, so that the structure and the control unavoidably become complicated.

For this reason, the above described liquid hydrocarbon-ethanol separation apparatus is desired to be lightweight, be small and have a simple structure in order to be mounted on a mobile unit such as automobile.

SUMMARY OF THE INVENTION

The present invention is designed with respect to the above described circumstances, and is directed at providing a gasoline-ethanol separation apparatus for separating gasoline and ethanol from a mixture fuel formed of mixed gasoline and ethanol with a simple structure.

The present invention is also directed at providing a gasoline-ethanol separation apparatus which has a simple structure and is used for an internal combustion engine.

In order to achieve the above described aspect, the present invention provides a gasoline-ethanol separation apparatus for separating a mixture fuel formed of mixed gasoline and ethanol into gasoline and an ethanol-water mixture liquid by mixing water with the mixture fuel, including: a fuel tank for accommodating the mixture fuel; water-supply means for supplying water to be mixed into the mixture fuel; a separation tank which separates the mixture fuel into the gasoline and the ethanol-water mixture liquid by mixing water supplied by the water-supply means with the mixture fuel supplied from the fuel tank, and stores the separated gasoline and the ethanol-water mixture liquid therein; pressurizing means for pressurizing the gasoline and the ethanol-water mixture liquid stored in the separation tank through the mixture fuel to be supplied from the fuel tank into the separation tank; gasoline-taking-out means for taking the gasoline out from an upper part of an interface between the gasoline and the ethanol-water mixture liquid stored in the separation tank to the outside of the separation tank through a first on-off valve; and ethanol-taking-out means for taking the ethanol-water mixture liquid stored in the separation tank out from a lower part of the interface to the outside of the separation tank through a second on-off valve.

The gasoline-ethanol separation apparatus according to the present invention, at first, supplies the above described mixture fuel into the above described separation tank from the above described fuel tank, and on the other hand, supplies the above described water into the above described separation tank with the above described water-supply means. As a result, a mixture fuel supplied from the above described fuel tank is newly mixed into a mixture fuel stored in the above described separation tank, and water is mixed with the mixture fuel.

When the above described mixture fuel is mixed with water, ethanol among fuels constituting the mixture fuel dissolves in water to form an ethanol-water mixture liquid, because ethanol is hydrophilic. On the other hand, gasoline among fuels constituting the above described mixture fuel does not mix with the above described ethanol-water mixture liquid because gasoline is hydrophobic, and is separated from the ethanol-water mixture liquid. As a result, the above described mixture fuel is separated into gasoline and the ethanol-water mixture liquid. The above described gasoline having relatively-small specific gravity forms an upper layer, and the above described ethanol-water mixture liquid having relatively-large specific gravity forms a lower layer, which are stored in a state of being separated into the upper layer and the lower layer in the above described separation tank.

At this time, the above described gasoline and the above described ethanol-water mixture stored in the above described separation tank are pressurized through the mixture fuel supplied into the separation tank by the above described pressurizing means, so that the separation tank results in being retained in a higher pressure state than that in the outside of the separation tank. For this reason, the gasoline-ethanol separation apparatus according to the present invention can take the above described gasoline stored in the separation tank out to the outside of the separation tank, through the above described means for taking out the gasoline only by opening a first on-off valve, because of a pressure difference formed between the inside and the outside of the above described separation tank. The gasoline-ethanol separation apparatus according to the present invention also can take the above described ethanol-water mixture liquid stored in the separation tank out to the outside of the separation tank, through the above described ethanol-taking-out means only by opening a second on-off valve.

Accordingly, the gasoline-ethanol separation apparatus according to the present invention can separate a mixture fuel formed of mixed gasoline and ethanol into the gasoline and an ethanol-water mixture liquid, and can take out the separated gasoline and the ethanol-water mixture liquid, with a simpler structure compared to a conventional gasoline-ethanol separation apparatus.

By the way, as the operation of taking the above described gasoline and the above described ethanol-water mixture liquid out to the outside of the above described separation tank progresses, storage quantities of the gasoline and the ethanol-water mixture liquid stored in the separation tank occasionally cause deviation. Then, the gasoline-ethanol separation apparatus according to the present invention preferably has an interface sensor for detecting the above described interface, and also has gasoline-returning means for returning the above described gasoline stored in the above described separation tank to the above described fuel tank from the upper part of the interface through a third on-off valve, when the interface detected by the interface sensor is lower than the predetermined position.

The gasoline-ethanol separation apparatus according to the present invention detects the interface between the above described gasoline and the above described ethanol-water mixture liquid stored in the above described separation tank, by the above described interface sensor, and opens the third on-off valve when the detected interface is lower than the predetermined position. Then, the inner part of the above described separation tank is kept in a higher pressure state than that of the outside of the separation tank by the above described pressurizing means, so that the above described gasoline stored in the separation tank is returned to the above described fuel tank by the above described gasoline-returning means. At this time, the above described gasoline-returning means returns the above described gasoline stored in an upper layer in the above described separation tank from the upper part of the above described interface to the above described fuel tank, and accordingly the above described ethanol-water mixture liquid stored in a lower layer of the separation tank is not mixed into the refluxed gasoline.

In the above described separation tank, the storage quantity of the above described gasoline decreases due to the above described returning operation. On the other hand, the above described mixture fuel is newly supplied to the separation tank. Then, the above described mixture fuel which has been newly supplied is separated into the above described gasoline and the above described ethanol-water mixture liquid, so that the storage quantity of the ethanol-water mixture liquid relatively increases to consequently elevate the above described interface to a higher position than that of the above described predetermined position. Thus, the gasoline-ethanol separation apparatus according to the present invention can resolve the deviation of storage quantity occurring in the above described gasoline and the above described ethanol-water mixture liquid in the above described separation tank, by returning the above described gasoline stored in the above described separation tank to the above described fuel tank with the use of the above described gasoline-returning means.

The gasoline-ethanol separation apparatus according to the present invention can make a first on-off valve work, for instance, as first fuel-injection means for injecting the above described gasoline stored in the above described separation tank into an internal combustion engine, and make a second on-off valve work, for instance, as second means for injecting the above described ethanol-water mixture liquid stored in the above described separation tank into the internal combustion engine.

The gasoline-ethanol separation apparatus according to the present invention also preferably includes ethanol-water separation means for separating the above described ethanol-water mixture liquid which has been taken out to the outside of the above described separation tank into ethanol and water with the use of the above described ethanol-taking-out means. The above described ethanol-water separation means can separate the ethanol-water mixture liquid to provide ethanol containing a lowered amount of water and water.

The gasoline-ethanol separation apparatus according to the present invention preferably supplies water separated by the above described ethanol-water separation means to the above described separation tank through the above described water-supply means. Water separated by the above described ethanol-water separation means can be recycled for separating the above described mixture fuel, by supplying the water to the above described separation tank through the above described water-supply means.

BRIEF DESCRIPTION OF THE DRAWINGS

FIGS. 2(a) to 4 are explanatory drawings for illustrating modified examples of the gasoline-ethanol separation apparatus illustrated in FIG. 1.

DETAILED DESCRIPTION OF THE PREFERRED EMBODIMENTS

Next, embodiments according to the present invention will now be described in more detail with reference to the attached drawings.

Figure 1:
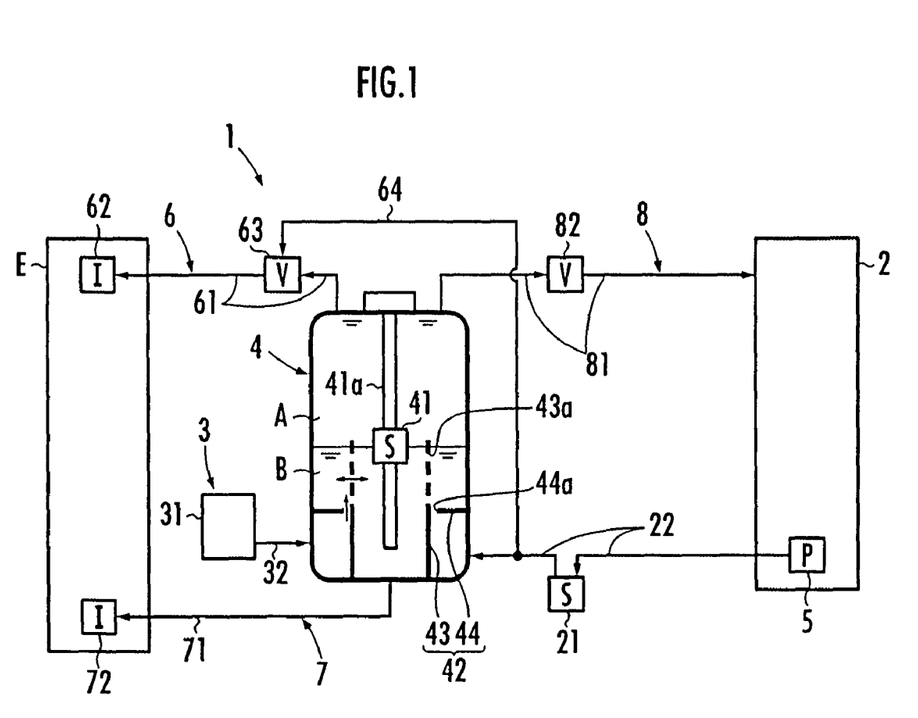
FIG. 1 is an explanatory drawing for illustrating one configuration example of a gasoline-ethanol separation apparatus according to an embodiment of the present invention.

A gasoline-ethanol separation apparatus 1 according to the present embodiments illustrated in FIGS. 1, 2(a) and 2(b) are an apparatus for mixing water with a mixture fuel of mixed gasoline and ethanol to separate the resultant liquid into gasoline and an ethanol-water mixture liquid, and is used for a compression ignition internal combustion engine (hereinafter referred to as engine) E, for instance. The engine E uses gasoline as its fuel when a low load is required, and uses a mixture of the gasoline and an added ethanol-water mixture liquid as its fuel when a high load is required.

The gasoline-ethanol separation apparatus 1 comprises: a fuel tank 2 for accommodating a mixture fuel of mixed gasoline and ethanol; water-supply means 3 for supplying water to be mixed to the mixture fuel; and a separation tank 4 for separating the fuel into gasoline (A) and an ethanol-water mixture liquid (B). The fuel tank 2 has a fuel pump 5 provided in a lower part of itself, which pressurizes the above described mixture fuel accommodated in the fuel tank 2 and supplies the mixture fuel to the separation tank 4. The separation tank 4 has: gasoline-taking-out means 6 for supplying the gasoline (A) stored in the separation tank 4 to the engine E; ethanol-taking-out means 7 for supplying the ethanol-water mixture liquid (B) stored in the separation tank 4 to the engine E; and gasoline-returning means 8 for returning the gasoline (A) stored in the separation tank 4 to the fuel tank 2.

The fuel tank 2 is connected to the separation tank 4 through a first liquid-supply pipe 22 of which one end is connected to the fuel pump 5. The first supply pipe 22 has an ethanol sensor 21 on the way, and the ethanol sensor 21 is connected to an arithmetic sequence unit (not shown). The above described arithmetic sequence unit determines the quantity of water to be supplied to the separation tank 4 by the water-supply means 3 based on ethanol concentration detected by the ethanol sensor 21, and controls the water-supply means 3.

The water-supply means 3 has a water tank 31 for accommodating water and a water supply pipe 32 for connecting the water tank 31 and the separation tank 4, and is connected to the above described arithmetic sequence unit.

The separation tank 4 is a unit for separating the above described mixture fuel supplied from the fuel tank 2 into the gasoline (A) and the ethanol-water mixture liquid (B), by mixing the mixture fuel with water supplied by the water-supply means 3. The separation tank 4 has an interface sensor 41 for detecting the interface between the stored gasoline (A) and the ethanol-water mixture liquid (B), and a flow-path-forming member 42 for forming a flow path for making a liquid stored in the separation tank 4 flow, and is connected to the first liquid-supply pipe 22 and the water supply pipe 32 in the lower part thereof.

The interface sensor 41 is a float sensor which floats on the interface between the gasoline (A) and the ethanol-water mixture liquid (B) in the separation tank 4, and can move in upward and downward directions along a guiding member 41a which is suspended from a ceiling part of the separation tank 4.

The flow-path-forming member 42 is constituted by a cylindrical distributor 43 provided in the central part and a discal distributor 44 provided in the perimeter of the distributor 43. In the present embodiment, the distributor is a member having a function for changing a direction of the liquid which moves in the separation tank 4. The cylindrical distributor 43 is provided in an outside of the interface sensor 41, and forms a flow path for making a liquid stored in the separation tank 4 flow along the perimeter of the distributor 43 in a peripheral direction. The distributor 43 has a plurality of through holes 43a formed therein so as to penetrate the plate through a thickness direction in the upper half, and forms a flow path for making the liquid stored in the separation tank 4 flow to an outer circumferential side and an inner circumferential side of the distributor 43 through the through holes 43a. On the other hand, the discal distributor 44 is installed so that the outer circumferential face contacts with an inner wall face of the separation tank 4, and the inner circumferential face has a gap 44a between itself and the distributor 43, and forms a flow path for making the liquid stored in the separation tank 4 flow in upward and downward directions through the gap 44a.

The fuel pump 5 pressurizes the above described mixture fuel stored in the fuel tank 2, and supplies the mixture fuel into the separation tank 4 through the first liquid-supply pipe 22. When the supply of the mixture fuel has progressed and the separation tank 4 is filled with the mixture fuel, the fuel pump 5 pressurizes the gasoline (A) and the ethanol-water mixture liquid (B) stored in the separation tank 4 through the mixture fuel to be supplied.

Gasoline-taking-out means 6 is constituted by: a second liquid-supply pipe 61 of which one end is connected to a ceiling part of the separation tank 4; and a first injector 62 of which the other end is connected to the other end of the second liquid-supply pipe 61, and which injects the gasoline (A) stored in the separation tank 4 into the engine E. The first injector 62 works as an on-off valve. The second liquid-supply pipe 61 has a three-way valve 63 on the way, and the three-way valve 63 has a branch pipe 64 connected thereto which is branched from the downstream side of the ethanol sensor 21 of the first liquid-supply pipe 22.

Ethanol-taking-out means 7 is constituted by: a third liquid-supply pipe 71 of which one end is connected to an inner circumferential side of the distributor 43 at the bottom part of the separation tank 4; and a second injector 72 of which the other end is connected to the other end of the third liquid-supply pipe 71, and which injects the ethanol-water mixture liquid (B) stored in the separation tank 4 to the engine E. The second injector 72 works as an on-off valve.

Gasoline-returning means 8 is constituted by: a fourth liquid-supply pipe 81 of which one end is connected to a ceiling part of the separation tank 4, and of which the other end is connected to the upper part of the fuel tank 2; and an on-off valve 82 provided on the way of the fourth liquid-supply pipe 81.

Next, an operation of the gasoline-ethanol separation apparatus 1 will now be described below with reference to FIG. 1.

In the gasoline-ethanol separation apparatus 1, at first, a fuel pump 5 is operated. At this time, the upstream side and the downstream side of a second liquid-supply pipe 61 are connected to each other by the three-way valve 63, and a branch pipe 64 side is intercepted. Injectors 62 and 72 working as on-off valves are closed, and an on-off valve 82 provided on the way of a fourth liquid-supply pipe 81 is closed.

Accordingly, when the fuel pump 5 operates, the above described mixture fuel stored in a fuel tank 2 is pressurized and supplied to the lower part of a separation tank 4 through a first liquid-supply pipe 22.

At this time, an ethanol sensor 21 detects the concentration of ethanol in the above described mixture fuel flowing through the first liquid-supply pipe 22. Subsequently, a water quantity to be supplied to the separation tank 4 is determined on the basis of the detected concentration of ethanol by the above described arithmetic sequence unit. The water of the quantity determined by the above described arithmetic sequence unit is supplied from a water tank 31 of water-supply means 3 to the lower part of the separation tank 4 through a water supply pipe 32.

The above described mixture fuel and water which have been supplied to the lower part of the separation tank 4 flow in the peripheral side of a cylindrical distributor 43 in a peripheral direction. At this time, the above described mixture fuel and water cannot directly flow toward the vicinity of an interface sensor 41, because the cylindrical distributor 43 is provided in the outside of the interface sensor 41. Thus, the cylindrical distributor 43 can prevent the interface sensor 41 from inaccurately detecting the above described interface.

The cylindrical distributor 43 can also prevent the above described mixture fuel and water from directly flowing into a third liquid-supply pipe 71, because of being provided in the peripheral side of the third liquid-supply pipe 71. Then, the above described mixture fuel and water flowing the peripheral side of the cylindrical distributor 43 in a peripheral direction diffuse while flowing through a gap 44a between the cylindrical distributor 43 and a discal distributor 44 and a through hole 43a of the cylindrical distributor 43, and are mixed with each other by the diffusion.

When the above described mixture fuel is mixed with water, ethanol among fuels constituting the mixture fuel forms the ethanol-water mixture liquid because of being hydrophilic, and gasoline is separated from the ethanol-water mixture liquid because of being hydrophobic. As a result, the above described mixture fuel is separated into the gasoline (A) and the ethanol-water mixture liquid (B). The gasoline (A) and the ethanol-water mixture liquid (B) are stored in the separation tank 4 in a state of being separated into two layers of an upper layer and a lower layer. The gasoline (A) having relatively-small specific gravity moves to the upper layer, and the ethanol-water mixture liquid (B) having relatively-large specific gravity stays in the lower layer. At this time, the interface sensor 41 detects the interface by moving in upward and downward directions along a guiding member 41a in the separation tank 4 and floating on the interface between the gasoline (A) and the ethanol-water mixture liquid (B).

In the present embodiment, the above described separation tank 4 is always filled with the gasoline (A) and the ethanol-water mixture liquid (B), so that the gasoline (A) and the ethanol-water mixture liquid (B) stored in the separation tank 4 are pressurized by the fuel pump 5 through the above described mixture fuel to be supplied to the separation tank 4. As a result, the inside of the separation tank 4 is kept at a higher pressure state than that of the outside of the separation tank 4, and causes a pressure difference between the inside and outside of the separation tank 4.

At this time, when a first injector 62 acting as an on-off valve is opened, the gasoline (A) stored in the separation tank 4 is injected into the engine E through the second liquid-supply pipe 61 by the above described pressure difference. In addition, when a second injector 72 acting as an on-off valve is opened, the ethanol-water mixture liquid (B) stored in the separation tank 4 is injected into the engine E through a third liquid-supply pipe 71 by the above described pressure difference.

As described above, the gasoline-ethanol separation apparatus 1 according to the present embodiment can inject the gasoline (A) and the ethanol-water mixture liquid (B) into the engine E by only opening the injectors 61 and 71, because the gasoline (A) and the ethanol-water mixture liquid (B) stored in the separation tank 4 are pressurized by the fuel pump 5, and the pressure in the inside of the separation tank 4 is kept at a higher state than in the outside of the separation tank 4. Accordingly, the gasoline-ethanol separation apparatus 1 according to the present embodiment can separate gasoline and ethanol from a mixture fuel formed of mixed gasoline and ethanol, and can take out the separated gasoline and ethanol, with a simpler structure compared to a conventional gasoline-ethanol separation apparatus.

By the way, as the injection of the gasoline (A) and the ethanol-water mixture liquid (B) to the engine E progresses in the gasoline-ethanol separation apparatus 1, storage quantities of the gasoline (A) and the ethanol-water mixture liquid (B) stored in the separation tank 4 occasionally cause deviation.

For instance, the storage quantity of the gasoline (A) increases compared to the storage quantity of the ethanol-water mixture liquid (B) in the separation tank 4, and the interface between the gasoline (A) and the ethanol-water mixture liquid (B) detected by the interface sensor 41 occasionally becomes lower than the lower limit in a predetermined range. In this case, when an on-off valve 82 is opened, the gasoline (A) stored in the separation tank 4 is returned to the fuel tank 2 through the fourth liquid-supply pipe 81 by the above described pressure difference formed between the inside and outside of the separation tank 4. At this time, the returned gasoline (A) is not contaminated by the ethanol-water mixture liquid (B) stored in the lower layer of the separation tank 4, because the fourth liquid-supply pipe 81 is connected with the separation tank 4 at the ceiling part.

By doing this way, the storage quantity of the gasoline (A) decreases by the above described returning operation in the separation tank 4. On the other hand, the above described mixture fuel which has been newly supplied into the separation tank 4 is separated into the gasoline (A) and the ethanol-water mixture liquid (B). Accordingly, the storage quantity of the ethanol-water mixture liquid (B) relatively increases, and as a result, the above described interface level rises. When the above described interface level detected by the interface sensor 41 has been returned to the above described predetermined range, the on-off valve 82 is closed to finish the returning operation of the gasoline (A).

Alternatively, the storage quantity of the ethanol-water mixture liquid (B) increases compared to the storage quantity of the gasoline (A) in the separation tank 4, and the interface between the gasoline (A) and the ethanol-water mixture liquid (B) detected by the interface sensor 41 occasionally becomes higher than the upper limit of the above described predetermined range. In this case, the downstream side of the second liquid-supply pipe 61 is connected to the branch pipe 64 with the use of the three-way valve 63, and the upstream side of the second liquid-supply pipe 61 is intercepted. By doing this way, one part of the above described mixture fuel supplied from the fuel tank 2 is branched to the branch pipe 64 and to the downstream side of the second liquid-supply pipe 61. The above described branched mixture fuel is directly injected to the engine E through the branch pipe 64 and the downstream side of the second liquid-supply pipe 61, by opening the first injector 62. At this time, the upstream side of the second liquid-supply pipe 61 is intercepted with the use of the three-way valve 63, so that the gasoline (A) stored in the separation tank 4 is not injected into the engine E, even when the first injector 62 is opened. In addition, the ethanol-water mixture liquid (B) stored in the separation tank 4 is injected into the engine E, by opening the second injector 72.

By doing this way, the storage quantity of the ethanol-water mixture liquid (B) decreases by the injection of the ethanol-water mixture liquid (B) to the engine E in the separation tank 4. On the other hand, the above described mixture fuel which has been newly supplied into the separation tank 4 is separated into the gasoline (A) and the ethanol-water mixture liquid (B). Thus, the storage quantity of the gasoline (A) relatively increases, and as a result, the above described interface is lowered. When the above described interface detected by the interface sensor 41 is returned to the above described predetermined range, the three-way valve 63 is returned to the original state (in which the upstream and downstream sides of the second liquid-supply pipe 61 are connected, and the branch pipe 64 side is intercepted).

By the above described operation, the gasoline-ethanol separation apparatus 1 can eliminate the deviation of storage quantities, which has occurred in the gasoline (A) and the ethanol-water mixture liquid (B) stored in the separation tank 4.

In the gasoline-ethanol separation apparatus 1 according to the present embodiment, the flow-path-forming member 42 in the separation tank 4 is configured by the cylindrical distributor 43 and the discal distributor 44, but may be differently configured.

Figure 2:
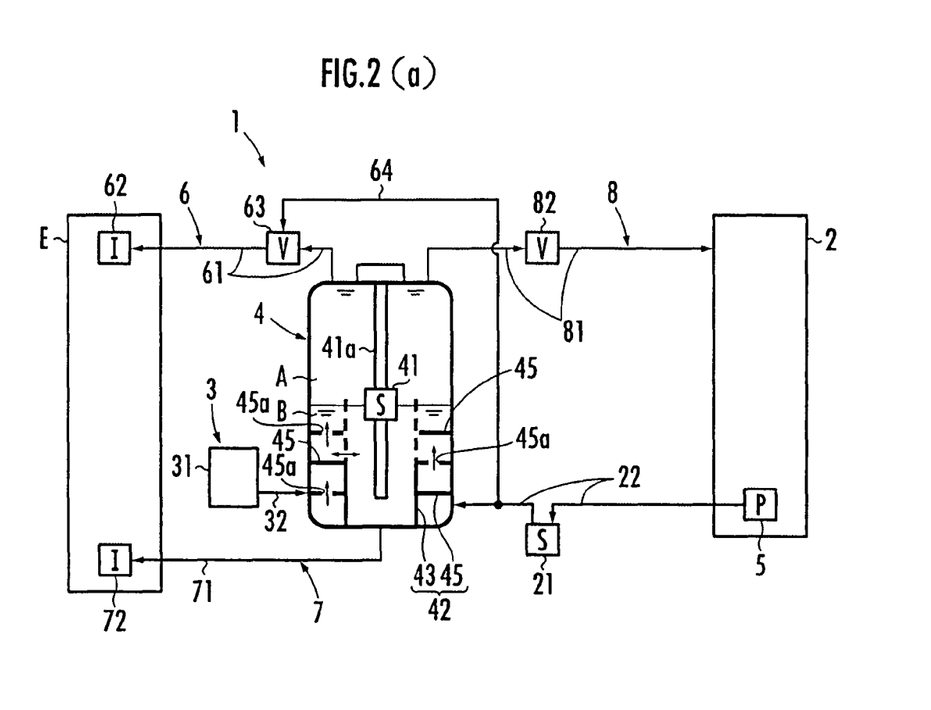

For instance, three pieces of discal distributors 45 having a through hole 45*a* which penetrates in a thickness direction may be used in place of the above described discal distributor 44, as is illustrated in FIG. 2(*a*). In this case, each discal distributor 45 is arranged so that the outer circumferential face contacts with the inner circumferential wall face of the separation tank 4, the inner circumferential face contacts the outer circumferential face of the cylindrical distributor 43, and the positions of the through holes 45*a* of adjacent distributors 45 stagger against each other. The three pieces of discal distributor 45 make the above described mixed fuel and water supplied to the lower part of the separation tank 4 flow in a sequence of a through hole 45*a* of the distributor 45 in a lower stage, a through hole 45*a* of the distributor 45 in a middle stage and a through hole 45*a* of the distributor 45 in an upper stage, while making the mixed fuel and water flow in the outer circumferential face side of the cylindrical distributor 43 in a peripheral direction. As a result, the three pieces of the discal distributors 45 can elongate the flow path of the above described mixed fuel and water supplied to the lower part of the separation tank 4, in comparison with one piece of the distributor 44. Accordingly, the three pieces of the discal distributors 45 can make the above described mixed fuel and water sufficiently diffuse into each other while they are flowing, and can make them sufficiently mixed with each other.

Alternatively, a spiral facepiece 46 which is arranged along the outer circumferential face of the cylindrical distributor 43 in a spiral shape may be used in place of the above described discal distributor 44, as is illustrated in FIG. 2(*b*). The spiral facepiece 48 can elongate the flow path of the above described mixed fuel and water supplied to the lower part of the separation tank 4, in comparison with one piece of the distributor 44, by making the above described mixed fuel and water supplied to the lower part of the separation tank 4 along the outer circumferential face of the cylindrical distributor 43 flow in a spiral form. Accordingly, the spiral facepiece 48 can make the above described mixed fuel and water sufficiently diffuse into each other while they are flowing, and can make them sufficiently mixed with each other.

In the gasoline-ethanol separation apparatus 1 according to the present embodiment, a porous body, a filter material or a mesh material (not shown) may be installed in place of the above described cylindrical distributor 43 and the above described discal distributor 44.

Figure 3:
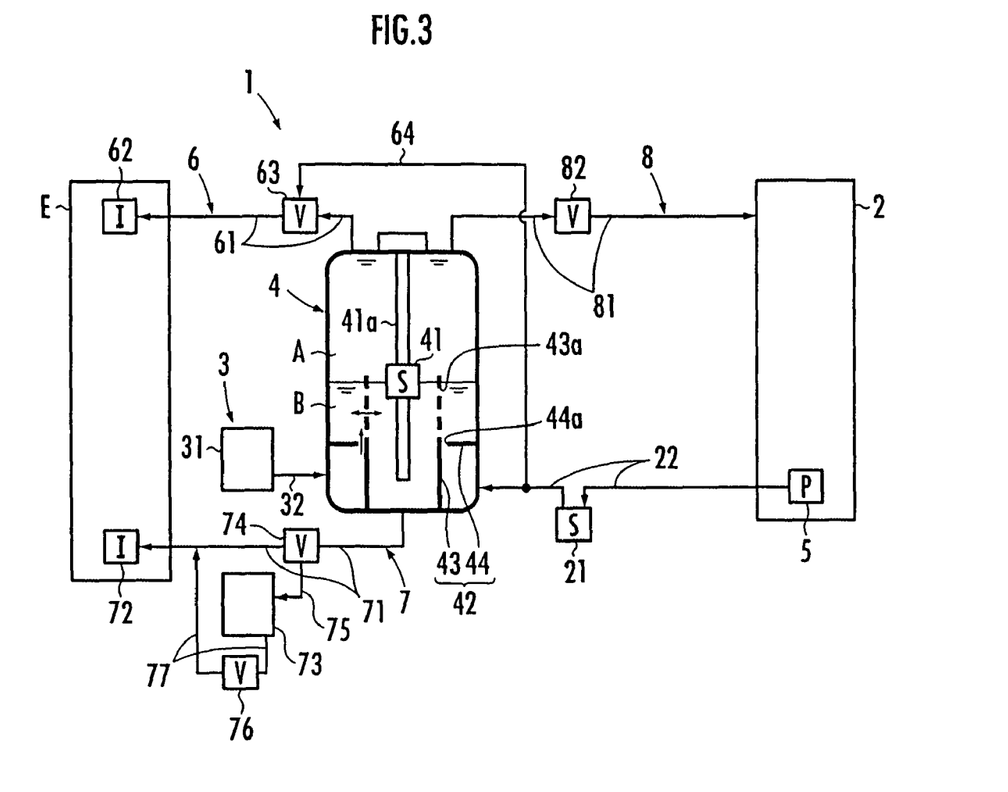

In the gasoline-ethanol separation apparatus 1 according to the present embodiment, the ethanol-taking-out means 7 may have an ethanol tank 73 for accommodating the ethanol-water mixture liquid (B), as is illustrated in FIG. 3. In this case, the third liquid-supply pipe 71 of the ethanol-taking-out means 7 has a three-way valve 74 on the way, and a branch pipe 75 branched from the three-way valve 74 is connected to the ethanol tank 73. One end of a fifth liquid-supply pipe 77 having an on-off valve 76 on the way is connected to the ethanol tank 73. The other end of the fifth liquid-supply pipe 77 joins a downstream side of the three-way valve 74 of the third liquid-supply pipe 71.

In the gasoline-ethanol separation apparatus 1 illustrated in FIG. 3, when the second injector 72 is opened in a state that upstream and downstream sides of the third liquid-supply pipe 71 are connected and the side of the branch pipe 75 is intercepted with the use of the three-way valve 74, the ethanol-water mixture liquid (B) stored in the separation tank 4 can be supplied to the engine E. When the storage quantity of the ethanol-water mixture liquid (B) becomes larger than the storage quantity of the gasoline (A), and as a result, the interface between the gasoline (A) and the ethanol-water mixture liquid (B) detected by the interface sensor 41 becomes higher than the upper limit of the above described predetermined range, the upstream side of the third liquid-supply pipe 71 is connected to the branch pipe 75 with the use of the three-way valve 74, and the downstream side of the third liquid-supply pipe 71 is intercepted. As a result, the ethanol-water mixture liquid (B) stored in the separation tank 4 is supplied to the ethanol tank 73. At this time, in the separation tank 4, the storage quantity of the ethanol-water mixture liquid (B) decreases. On the other hand, the above described mixed fuel which is newly supplied to the separation tank 4 is separated into the gasoline (A) and the ethanol-water mixture liquid (B). Accordingly, in the gasoline-ethanol separation apparatus 1 illustrated in FIG. 3, the storage quantity of the gasoline (A) relatively increases, and can eliminate the deviation of storage quantities, which has occurred in the gasoline (A) and the ethanol-water mixture liquid (B) stored in the separation tank 4.

When the supply of the ethanol-water mixture liquid (B) to the ethanol tank 73 has progressed and the ethanol tank 73 is filled with the ethanol-water mixture liquid (B), the ethanol-water mixture liquid stored in the ethanol tank 73 is pressurized through the above described mixed fuel to be supplied to the separation tank 4 by the fuel pump 5, so that the pressure in the inside of the ethanol tank 73 is kept in a higher state than in the outside of the ethanol tank 73, and causes a pressure difference between the inside and outside of the ethanol tank 73. At this time, when the second injector 72 is opened, the gasoline-ethanol separation apparatus 1 illustrated in FIG. 3 can supply the ethanol-water mixture liquid stored in the ethanol tank 73 to the engine E through the fifth liquid-supply pipe 77 by the above described pressure difference.

Figure 4:
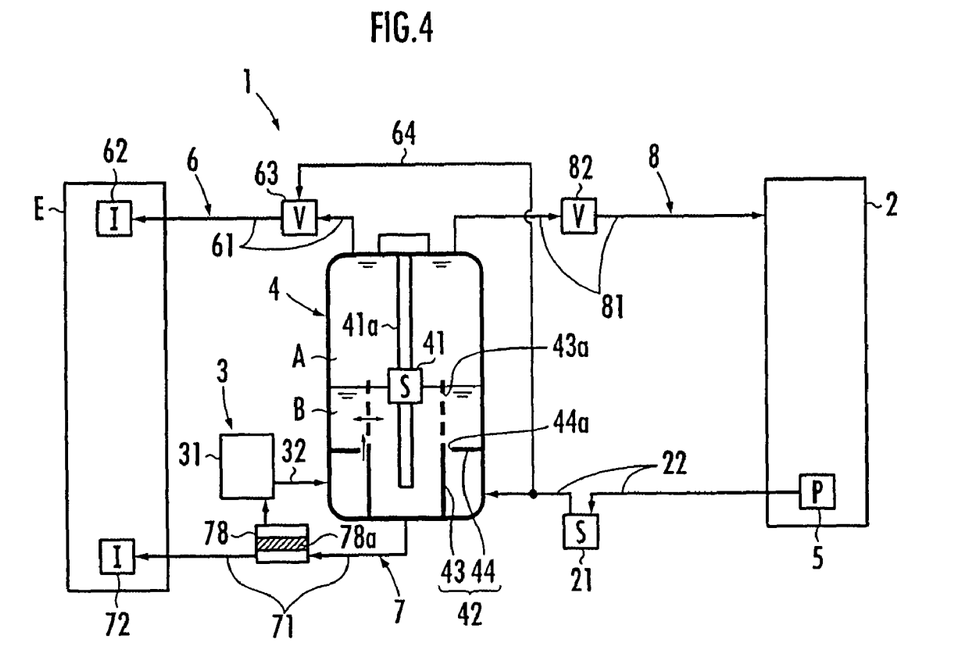

In the gasoline-ethanol separation apparatus 1 according to the present embodiment, the ethanol-taking-out means 7 may have an ethanol-water separation member 78 for separating the ethanol-water mixture liquid (B) into ethanol and water in the middle of the third liquid-supply pipe 71, as is illustrated in FIG. 4. In this case, the ethanol-water separation member 78 has a zeolite film 78a or a water separation film having a hollow fiber structure in the inner part. When the ethanol-water mixture liquid (B) stored in the separation tank 4 passes through the ethanol-water separation member 78 when flowing through the second liquid-supply pipe 71, the zeolite film 78a separates water from the ethanol-water mixture liquid (B); and when the second injector 72 is opened, the ethanol remaining after water has been separated from the ethanol-water mixture liquid (B) is supplied to the engine E. On the other hand, water separated by the zeolite film 78a is supplied to the water tank 3, is then supplied to the separation tank 4 through the water supply pipe 32, and is reused for separating the above described mixture fuel. Accordingly, the gasoline-ethanol separation apparatus 1 illustrated in FIG. 4 can supply ethanol having higher energy efficiency than the ethanol-water mixture liquid (B) to the engine E, and can reuse water which has been separated from the ethanol-water mixture liquid (B) for separating the above described mixture fuel.

The gasoline-ethanol separation apparatus 1 according the present embodiment is configured to determine the quantity of water to be supplied to the separation tank 4 by water-supply means 3 based on the concentration of ethanol detected by an ethanol sensor 21 with the use of the above described arithmetic sequence unit, but may provide a detector (not shown) for detecting an amount of the ethanol-water mixture liquid (B) to be injected from the second injector 72, and may be configured to determine the above described water quantity based on the integrated amount of the amount to be injected detected by the detector and the above described concentration of ethanol, with the use of the above described arithmetic sequence unit.

In the present embodiment, the gasoline-ethanol separation apparatus 1 is described as the one to be used in a homogeneous charge ignition internal combustion engine E, but may be used in a spark ignition type internal combustion engine.

What is claimed is:

1. A gasoline-ethanol separation apparatus for separating a mixture fuel formed of mixed gasoline and ethanol into gasoline and an ethanol-water mixture liquid by mixing water with the mixture fuel, comprising:
    a fuel tank for accommodating the mixture fuel;
    water-supply means for supplying water to be mixed into the mixture fuel;
    a separation tank which separates the mixture fuel into the gasoline and the ethanol-water mixture liquid by mixing water supplied by the water-supply means with the mixture fuel supplied from the fuel tank, and stores the separated gasoline and the ethanol-water mixture liquid therein;
    a flow-path-forming member having an inner circumference with through holes located within the separation tank, the flow-path-forming member changing a direction of gasoline and ethanol-water mixture liquid moving in the separation tank;
    pressurizing means for pressurizing the gasoline and the ethanol-water mixture liquid stored in the separation tank through the mixture fuel to be supplied from the fuel tank into the separation tank;
    gasoline-taking-out means for taking the gasoline out from an upper part of an interface between the gasoline and the ethanol-water mixture liquid stored in the separation tank to the outside of the separation tank through a first on-off valve; and
    ethanol-taking-out means for taking the ethanol-water mixture liquid stored in the separation tank out from a lower part of the interface from within the inner circumference of the flow-path-forming member to the outside of the separation tank through a second on-off valve.

2. The gasoline-ethanol separation apparatus according to claim 1 further comprising:
    an interface sensor for detecting the interface; and
    gasoline-returning means for returning the gasoline stored in the separation tank from the upper part of the interface into the fuel tank through a third on-off valve, when the interface detected by the interface sensor is lower than a predetermined position.

3. The gasoline-ethanol separation apparatus according to claim 2, wherein
    the interface sensor is a float sensor.

4. The gasoline-ethanol separation apparatus according to claim 1, wherein
    the first on-off valve is first fuel-injection means for injecting the gasoline stored in the separation tank into an internal combustion engine, and
    the second on-off valve is second fuel-injection means for injecting the ethanol-water mixture liquid stored in the separation tank into the internal combustion engine.

5. The gasoline-ethanol separation apparatus according to claim 1 further comprising:
    an ethanol sensor for detecting a concentration of the ethanol in the mixture fuel supplied from the fuel tank into the separation tank; and
    control means for determining the quantity of water to be supplied to the separation tank by the water-supply means, on the basis of the concentration of the ethanol in the mixture fuel detected by the ethanol sensor.

6. The gasoline-ethanol separation apparatus according to claim 1, wherein
    the flow path forming member is structurally configured such that the separated gasoline and the ethanol-water mixture liquid stored in the separation tank flows through the flow path forming member.

7. The gasoline-ethanol separation apparatus according to claim 6, wherein
    the flow-path-forming member comprises a cylindrical distributor and a single discal distributor, the discal distributor is provided at an outer circumferential side of the cylindrical distributor with the existence of a gap, and an outer circumferential surface of the discal distributor is in contact with an inner sidewall of the separation tank.

8. The gasoline-ethanol separation apparatus according to claim 1, wherein
    the ethanol-taking-out means has an ethanol tank for accommodating the ethanol-water mixture liquid which has been taken out to the outside of the separation tank.

9. The gasoline-ethanol separation apparatus according to claim 1 further comprising:
    ethanol-water separation means for separating the ethanol-water mixture liquid which has been taken out to the outside of the separation tank by the ethanol-taking-out means, into ethanol and water.

10. The gasoline-ethanol separation apparatus according to claim 9, wherein the ethanol-water separation means has a zeolite film in the inner part.

11. The gasoline-ethanol separation apparatus according to claim 9, wherein
    the ethanol-water separation means has a water separation film made of a hollow fiber film in the inner part.

12. The gasoline-ethanol separation apparatus according to claim 9 further comprising:

supplying water separated by the ethanol-water separation means to the separation tank through the water-supply means.

13. A gasoline-ethanol separation apparatus for separating a mixture fuel formed of mixed gasoline and ethanol into gasoline and an ethanol-water mixture liquid by mixing water with the mixture fuel, comprising:
- a fuel tank for accommodating the mixture fuel;
- water-supply means for supplying water to be mixed into the mixture fuel;
- a separation tank which separates the mixture fuel into the gasoline and the ethanol-water mixture liquid by mixing water supplied by the water-supply means with the mixture fuel supplied from the fuel tank, and stores the separated gasoline and the ethanol-water mixture liquid therein;
- pressurizing means for pressurizing the gasoline and the ethanol-water mixture liquid stored in the separation tank through the mixture fuel to be supplied from the fuel tank into the separation tank;
- gasoline-taking-out means for taking the gasoline out from an upper part of an interface between the gasoline and the ethanol-water mixture liquid stored in the separation tank to the outside of the separation tank through a first on-off valve; and
- ethanol-taking-out means for taking the ethanol-water mixture liquid stored in the separation tank out from a lower part of the interface to the outside of the separation tank through a second on-off valve,
- wherein the separation tank has a flow-path-forming member for forming a flow path for making a liquid stored in the tank flow therethrough, and
- wherein the flow-path-forming member comprises a cylindrical distributor and a plurality of discal distributors, and the discal distributors are provided in the outer circumferential side of the cylindrical distributor so as to contact with the outer circumference and have through holes which are arranged so as to stagger against each other of the adjacent discal distributors.

14. A gasoline-ethanol separation apparatus for separating a mixture fuel formed of mixed gasoline and ethanol into gasoline and an ethanol-water mixture liquid by mixing water with the mixture fuel, comprising:
- a fuel tank for accommodating the mixture fuel;
- water-supply means for supplying water to be mixed into the mixture fuel;
- a separation tank which separates the mixture fuel into the gasoline and the ethanol-water mixture liquid by mixing water supplied by the water-supply means with the mixture fuel supplied from the fuel tank, and stores the separated gasoline and the ethanol-water mixture liquid therein;
- pressurizing means for pressurizing the gasoline and the ethanol-water mixture liquid stored in the separation tank through the mixture fuel to be supplied from the fuel tank into the separation tank;
- gasoline-taking-out means for taking the gasoline out from an upper part of an interface between the gasoline and the ethanol-water mixture liquid stored in the separation tank to the outside of the separation tank through a first on-off valve; and
- ethanol-taking-out means for taking the ethanol-water mixture liquid stored in the separation tank out from a lower part of the interface to the outside of the separation tank through a second on-off valve,
- wherein the separation tank has a flow-path-forming member for forming a flow path for making a liquid stored in the tank flow therethrough, and
- wherein the flow-path-forming member comprises a cylindrical distributor and a spiral face body which is arranged along the outer circumferential face of the cylindrical distributor in a spiral shape.

* * * * *